United States Patent
Jin et al.

(10) Patent No.: US 8,705,488 B2
(45) Date of Patent: Apr. 22, 2014

(54) METHOD FOR SUPPORTING IDLE MODE IN WIRELESS LOCAL AREA NETWORK SYSTEM

(75) Inventors: Sung-Geun Jin, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 219 days.

(21) Appl. No.: 12/817,504

(22) Filed: Jun. 17, 2010

(65) Prior Publication Data

US 2010/0322217 A1  Dec. 23, 2010

(30) Foreign Application Priority Data

Jun. 17, 2009  (KR) .................. 10-2009-0053910
Jun. 17, 2010  (KR) .................. 10-2010-0057578

(51) Int. Cl.
*H04W 4/00* (2009.01)
*H04W 36/00* (2009.01)

(52) U.S. Cl.
USPC ......................... 370/331; 370/338; 455/436

(58) Field of Classification Search
None
See application file for complete search history.

(56) References Cited

U.S. PATENT DOCUMENTS

| 7,590,421 B2* | 9/2009 | Ryu et al. ............... 455/436 |
| 2002/0031107 A1* | 3/2002 | Li et al. ................. 370/338 |
| 2006/0039332 A1* | 2/2006 | Kotzin ................... 370/338 |
| 2007/0115873 A1 | 5/2007 | Kim et al. |
| 2008/0137682 A1* | 6/2008 | Kish et al. .............. 370/432 |
| 2008/0212508 A1 | 9/2008 | Morimoto et al. |

FOREIGN PATENT DOCUMENTS

KR  10-2009-0020877  *  2/2009  ............. H04B 7/26

OTHER PUBLICATIONS

Ericsson ("Handover between WCDMA and GSM", 2003, all pages).*

* cited by examiner

*Primary Examiner* — Gregory Sefcheck
*Assistant Examiner* — Srinivasa Reddivalam
(74) *Attorney, Agent, or Firm* — Staas & Halsey LLP (57) ABSTRACT

Disclosed is a method for supporting an idle mode of a terminal in a wireless local area network (WLAN) system. In the method, a first request message for starting an idle mode is transmitted to a first access node to which the terminal is currently connected and a first response message with respect to the first request message is received from the first access node, and in this case, when the first response message includes acceptance information with respect to the start of the idle mode, the idle mode starts.

20 Claims, 6 Drawing Sheets

METHOD FOR SUPPORTING IDLE MODE IN WIRELESS LOCAL AREA NETWORK SYSTEM

CROSS-REFERENCE TO RELATED APPLICATION

This application claims priority to and the benefit of Korean Patent Application Nos. 10-2009-0053910 and 10-2010-0057578 filed in the Korean Intellectual Property Office on Jun. 17, 2009 and Jun. 17, 2010, the entire contents of which are incorporated herein by reference.

BACKGROUND OF THE INVENTION (a) Field of the Invention

The present invention relates to a method for supporting an idle mode of a terminal in a wireless local area network (WLAN) system.

(b) Description of the Related Art

The advancement of information communication technology has been prompting development of various wireless communication techniques. Among the various wireless communication techniques, a wireless local area network (WLAN) is a technique allowing users to wirelessly access the Internet at homes or in offices, or in a particular service providing area, with a terminal based on a radio frequency technique.

A WLAN system includes a plurality of basic service sets (BSSs), and each BSS includes an access point (AP) and a plurality of terminals. Communication within a BSS is made through an AP, and a terminal is connected to the access node in order to access a network.

Meanwhile, in a general mobile communication field, when there is no call, the terminal operates in an idle mode. When the terminal operates in the idle mode, procedures other than signaling for checking an arrival of a call are minimized to reduce power consumption.

In this case, however, there is no definition for the idle mode of the terminal in the WLAN system. Thus, when the terminal moves in a state in which there is no call in the WLAN system, there is no way to track the location of the terminal while saving power of the terminal.

SUMMARY OF THE INVENTION

The present invention has been made in an effort to provide a method for supporting an idle mode of a terminal in a wireless local area network (WLAN) system. In particular, the present invention provides an operating method supporting mobility of a terminal when the terminal moves while operating in an idle mode.

An exemplary embodiment of the present invention provides a method for supporting an idle mode of a terminal in a wireless local area network (WLAN) system, including: transmitting a first request message for starting an idle mode to a first access node to which the terminal is currently connected; receiving a first response message with respect to the first request message from the first access node; and starting an idle mode when the first response message includes acceptance information with respect to a start of the idle mode.

Another embodiment of the present invention provides a method for supporting an idle mode of a terminal by an access node in a WLAN system, including: receiving a request message for a connection to the access node from a terminal that has entered an area of the access node while operating in an idle mode; when it is determined that IP handoff is required for the terminal, transmitting an IP handoff request message to an IP handoff supporting device to which the access node is connected; and after the IP handoff supporting device performs an IP handoff procedure, establishing a connection with the terminal.

Yet another embodiment of the present invention provides an Internet protocol (IP) handoff method of a terminal in a WLAN system, including: transmitting a request message for a connection to an access node, to the access node, when the terminal enters an area of the access node while operating in an idle mode; receiving a response message with respect to the request message from the access node; receiving a router broadcast message regarding IP handoff from the access node; and performing IP handoff by using the router broadcast message.

Still another embodiment of the present invention provides a method for supporting, by an access node, IP handoff of a terminal in a WLAN system, including: receiving a request message for a connection to the access node from a terminal that has entered an area of the access node while the terminal is operating in an idle mode; transmitting a response message with respect to the request, to the terminal; and transmitting a router broadcast message regarding IP handoff in a unicast manner to the terminal.

According to exemplary embodiments of the present invention, a method for supporting an idle mode of a terminal in a WLAN system is provided. In particular, when the terminal moves while operating in the idle mode, an operation method supporting mobility of the terminal is provided. Thus, power consumption of the terminal can be reduced and idle time of the terminal can be increased.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In this document, a terminal may refer to a mobile station (MS), a mobile terminal (MT), a subscriber station (SS), a portable subscriber station (PSS), user equipment (UE), an access terminal (AT), and the like, and include entire or partial functions of the terminal, MS, MT, SS, PSS, UE, AT, and the like.

In this document, an access point (AP) may refer to a base station (BS), a radio access station (RAS), a Node B, an evolved Node B (eNodeB), a base transceiver station (BTS), a mobile multihop relay (MMR)-BS, and the like, and include the entire or partial functions of the AP, BS, RAS, Node B, eNodeB, BTS, MMR-BS, and the like.

Figure 1:
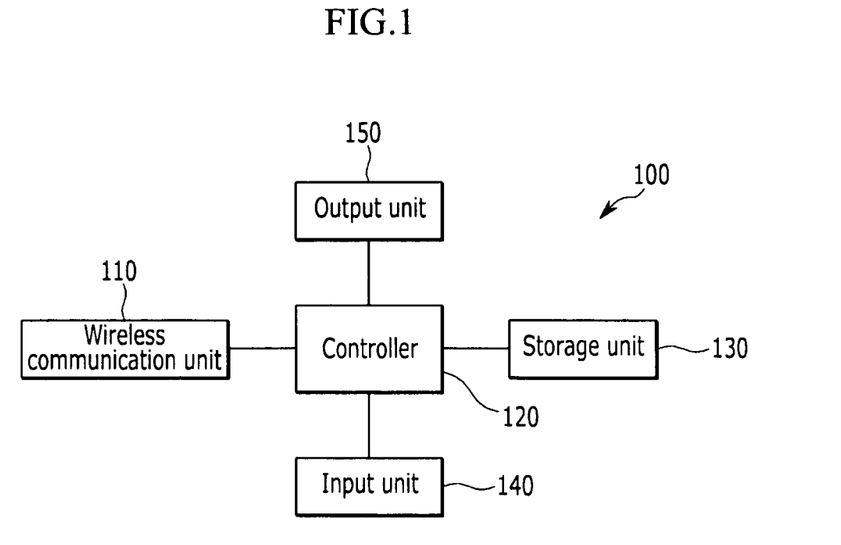
FIG. 1 is a schematic block diagram of a terminal according to an exemplary embodiment of the present invention.
Figure 2:
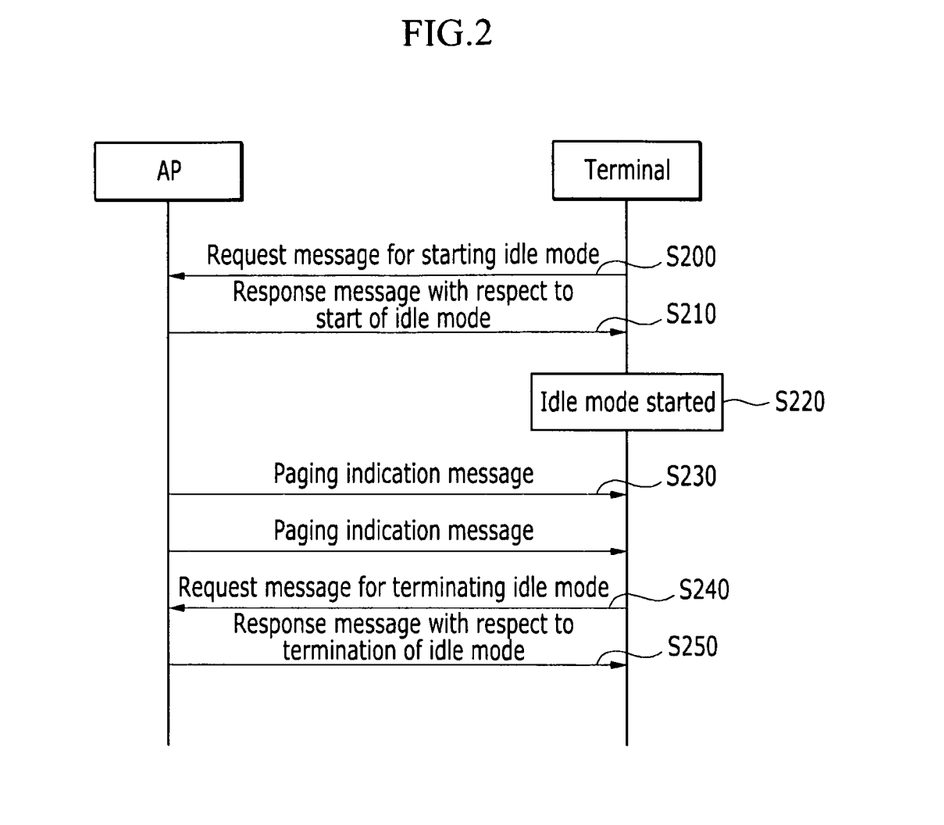
FIG. 2 is a flowchart illustrating the process of a method for operating a terminal in an idle mode in a wireless local area network (WLAN) system according to an exemplary embodiment of the present invention.

FIG. 1 is a schematic block diagram of a terminal according to an exemplary embodiment of the present invention, and FIG. 2 is a flowchart illustrating how the terminal operates in an idle mode in a wireless local area network (WLAN) system according to an exemplary embodiment of the present invention.

With reference to FIG. 1, a terminal 100 includes a wireless communication unit 110, a controller 120, a storage unit 130, an input unit 140, and an output unit 150.

The wireless communication unit 110 performs a radio communication function of the terminal 100. The wireless communication unit 110 may include a radio frequency (RF) unit for transmitting and receiving an RF signal. The controller 120 controls a general operation of the terminal 100. The controller 120 may include a data processing unit for encoding and modulating a transmitted signal or demodulating and decoding a received signal.

The storage unit 130 stores a program for operating the controller 120 and inputted or outputted data.

The input unit 140 receives data or information for controlling the operation of the terminal from a user.

The output unit 150 displays information processed by the terminal 100 in the form of various types of signals (e.g., an audio signal, a visual signal, etc.) in order to allow the user to see it.

With reference to FIGS. 1 and 2, the terminal transmits a request message for starting an idle mode to an access point (AP) currently connected with the terminal 100 (S200).

Upon receiving the request message for starting the idle mode from the terminal, the AP transmits a response message with respect to the start of the idle mode to the terminal 100 (S210). The response message with reference to the idle mode includes information accepting or rejecting the start of the idle mode of the terminal. For example, when the AP determines that the terminal fails to meet the conditions for starting the idle mode, the AP may transmit a response message including information rejecting the start of the idle mode of the terminal to the terminal.

When the terminal receives a response message including information accepting the start of the idle mode, the terminal starts the idle mode (S220). When the terminal starts the idle mode, it does not receive traffic from the AP. Thus, while in the idle mode, the terminal does not perform an operation regarding traffic transmission and reception, so power consumption can be reduced.

When traffic arrives from a network for the terminal that has started the idle mode, the AP transmits a paging indication message including traffic arrival information to the terminal (S230). The paging indication message may be periodically transmitted. The period for transmitting the paging indication message may be negotiated through a process of exchanging the request message for starting the idle mode and the response message with respect to the start of the idle mode between the terminal and the AP. The paging indication message may be transmitted through a beacon message or a multicast or broadcast message. Alternatively, the paging indication message may be transmitted through a flexible multicast service (FMS). The paging indication message may be included in the request message for starting the idle mode and the response message regarding the start of the idle mode exchanged between the terminal and the AP through the FMS. The terminal and the AP can precisely adjust a transmission period and a transmission time point of the paging indication message through the FMS. Thus, the AP may transmit the paging indication message with respect to the terminal at a transmission period that is longer than a transmission period of the beacon message.

Meanwhile, the paging indication message may include an identifier identifying a terminal. The AP may transmit a paging indication message to a single terminal or may simultaneously transmit the paging indication message to a plurality of terminals. When the AP simultaneously transmits the paging indication message to a plurality of terminals, the paging indication message may use an address of a group to which the plurality of terminals belong, as an identifier. In order to allow the paging indication message to simultaneously indicate several terminals, a medium access control (MAC) address of a terminal may be hashed to generate an identifier.

Upon receiving the paging indication terminal from the AP, the terminal performs an operation for terminating the idle mode. That is, the terminal transmits a request message for terminating the idle mode to the AP (S240), and the AP transmits a response message with respect to the termination of the idle mode to the terminal (S250). The response message with respect to the termination of the idle mode includes acceptance information or rejection information with respect to the request for terminating the idle mode of the terminal. The acceptance information refers to information allowing the terminal to terminate its idle mode, and the rejection information refers to information allowing the terminal to maintain the idle mode. Meanwhile, when the AP simultaneously transmits the paging indication message to the plurality of terminals, the AP may transmit a response message with respect to the termination of the idle mode to each terminal. That is, even when the plurality of terminals that have received the paging indication message obtained by hashing a MAC address from the AP transmit a request message for terminating the idle mode of each terminal to the AP, the AP may separately determine whether or not each terminal is to terminate the idle mode and transmit a response message with respect to the termination of the idle mode.

It has been described that the request message for starting the idle mode and the request message for terminating the idle mode are discriminated, and that the response message with respect to the start of the idle mode and the response message with respect to the termination of the idle mode are discriminated. However, an idle mode request message may be configured to include the information requesting the start of the idle mode or information requesting the termination of the idle mode, and an idle mode response message may be configured to include response information with respect to the request for starting the idle mode and response information with respect to the request for terminating the idle mode.

Figure 3:
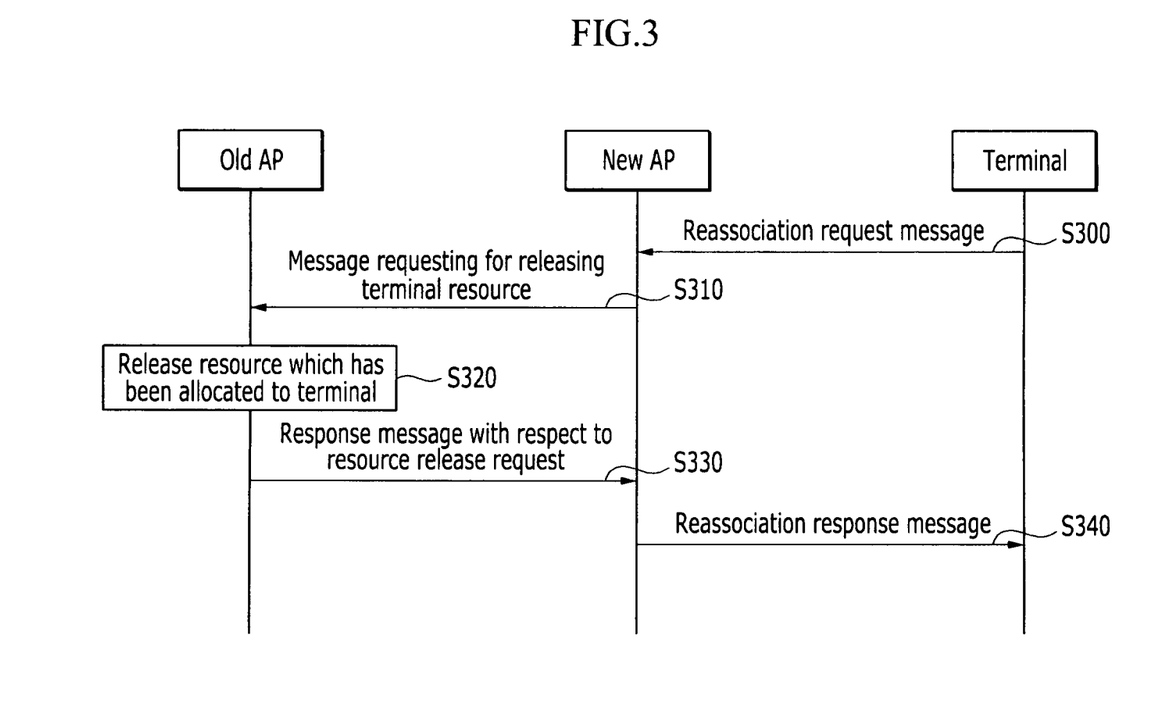
FIG. 3 is a flowchart illustrating how a terminal moves to a new access point (AP) while operating in an idle mode according to an exemplary embodiment of the present invention.

Meanwhile, the terminal may move while it is operating in the idle mode. FIG. 3 is a flowchart illustrating the process of how a terminal moves to a new AP while operating in the idle mode according to an exemplary embodiment of the present invention. In the following description, an old AP refers to an AP to which a terminal was connected when it started the idle mode, and a new AP refers to an AP to which the terminal is to be newly connected after moving while operating in the idle mode.

With reference to FIG. 3, when the terminal moves to an area of the new AP, it attempts to be connected to the new AP. That is, the terminal transmits a reassociation request message to the new AP (S300). The reassociation request message may include a MAC address of the old AP. The reassociation request message may further include information included in a request message for starting the idle mode that was transmitted to the old AP when the terminal was connected with the old AP. The reassociation request message may include information requesting the start of the idle mode included in the FMS request message.

The new AP transmits a request message for releasing resources with respect to the corresponding terminal to the old AP by using the information included in the reassociation request message received from the terminal (S310). Upon receiving the request message for releasing resources, the old AP recognizes that the corresponding terminal has moved to the new AP, terminates supporting the idle mode of the corresponding terminal, and releases the resources allocated to the corresponding terminal (S320).

The old AP that had received the request message for releasing resources transmits a response message with respect to the request for releasing the resources to the new AP (S330). During the process in which the terminal has moved and transmits the reassociation request message to the new AP and the new AP transmits the resource release request to the old AP, when the old AP receives data headed for the terminal from a network, the old AP may include the data headed for the terminal and control information indicating the termination of the idle mode of the terminal in the response message and transmit the response message.

Upon receiving the response message with respect to the resource release request from the old AP, the new AP transmits a reassociation response message (S340). When the response message with respect to the resource release request received from the old AP includes the control information requesting the termination of the idle mode of the terminal, the new AP may include the information regarding the termination of the idle mode of the terminal in the reassociation response message and transmit the reassociation response message. Meanwhile, the reassociation response message includes information corresponding to the reassociation request message. That is, when the reassociation request message includes information included in the idle mode request message, the reassociation response message may include acceptance information included in the idle mode response message. When the reassociation request message includes information included in the FMS request information, the reassociation response message may include response information with respect to the FMS request information.

Figure 4:
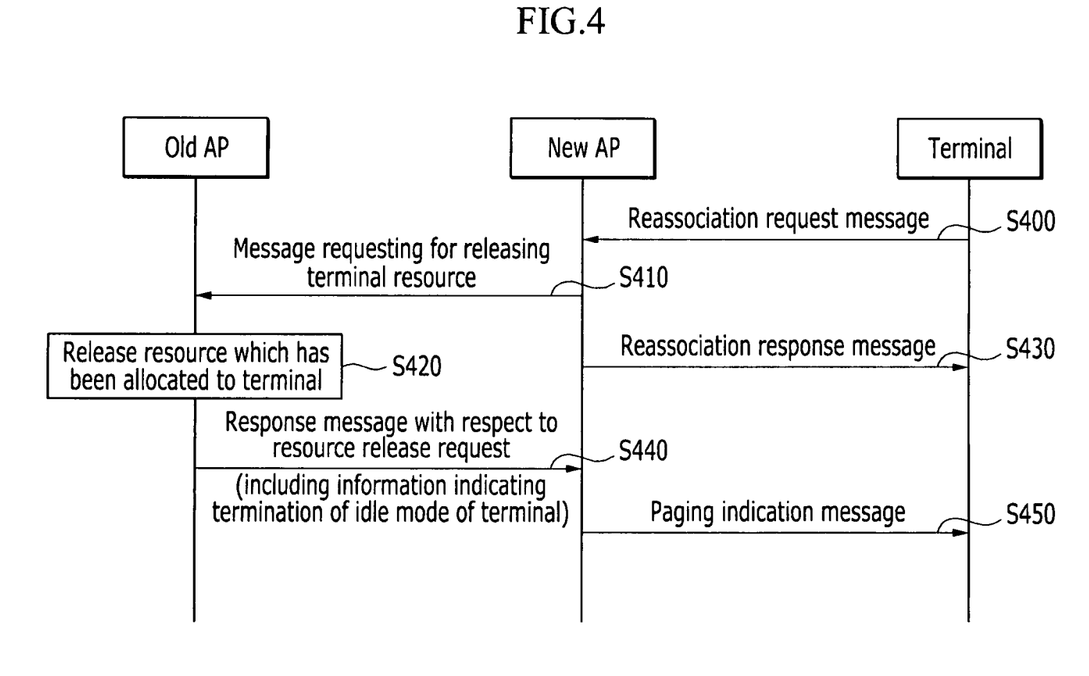
FIG. 4 is a flowchart illustrating how a terminal moves to a new access point (AP) while operating in an idle mode according to another exemplary embodiment of the present invention.

FIG. 4 is a flowchart illustrating the process of how the terminal moves to the new AP while operating in the idle mode according to another exemplary embodiment of the present invention. Description of any contents or explanations that have already been made with reference to FIG. 3 will be omitted.

With reference to FIG. 4, when the terminal moves to the area of the new AP, the terminal attempts to be connected to the new AP. That is, the terminal transmits a reassociation request message to the new AP (S400). The new AP transmits a request message for releasing resources of the corresponding terminal to the old AP by using the information included in the reassociation request message that has been received from the terminal (S410). Upon receiving the request message for releasing resources, the old AP recognizes that the corresponding terminal has moved to the new AP, stops supporting the idle mode of the corresponding terminal, and releases the resources that have been allocated to the corresponding terminal (S420).

After the new AP transmits the resource release request to the old AP, it transmits a reassociation response message to the terminal (S430). Thereafter, when the new AP receives a response message with respect to the resource release request including the control information indicating termination of the idle mode of the terminal from the old AP (S440), the new AP transmits a paging indication message indicating the termination of the idle mode to the terminal (S450). The paging indication message may be transmitted by using at least one of a beacon message, an FMS, and a broadcast message.

The exemplary embodiment of FIG. 4 is different from the exemplary embodiment of FIG. 3 in that the new AP transmits the reassociation response message to the terminal without waiting for a response message with respect to the resource release request from the old AP. In this case, however, in both exemplary embodiments, the reassociation response message may include the paging indication information, that is, the information indicating the termination of the idle mode of the terminal.

Meanwhile, IP mobility of the terminal operating in the idle mode in the WLAN system needs to be supported. IP mobility may be divided into a proxy mobile IP (MIP) technique in which IP mobility is managed by a network, and an MIP technique in which a terminal directly manages IP mobility.

Figure 5:
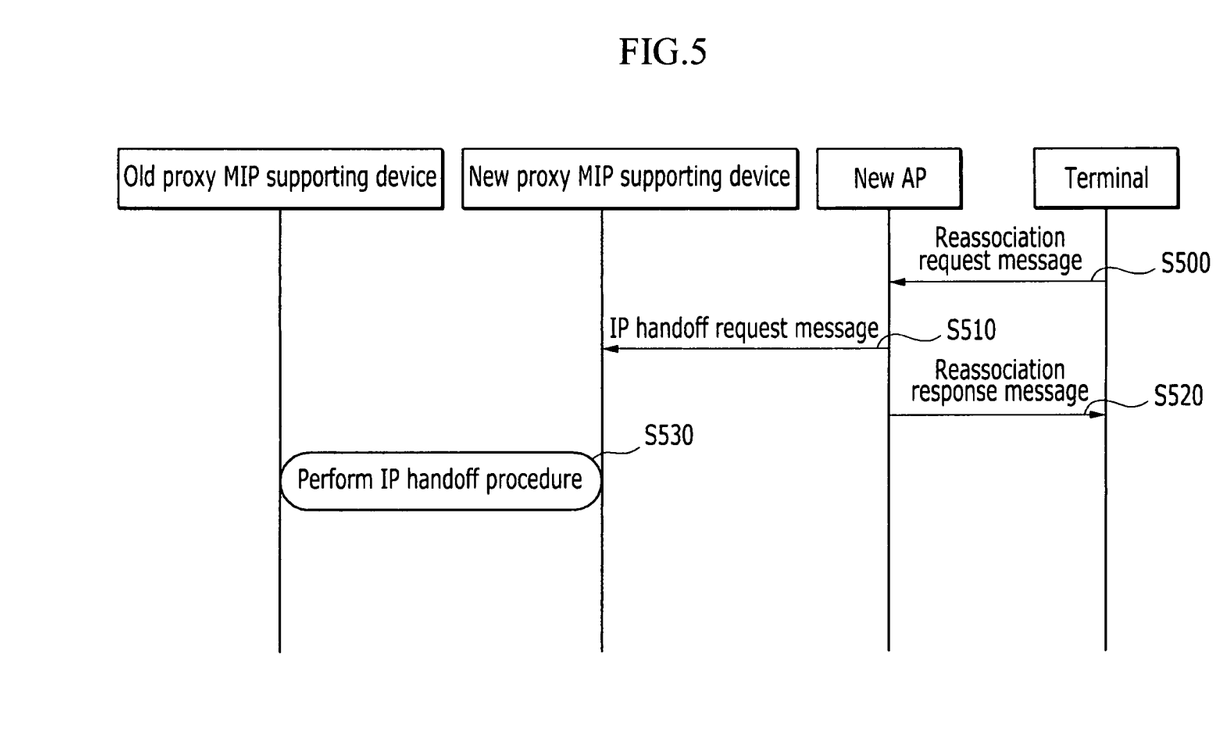
FIG. 5 is a flowchart illustrating the process of an IP handoff method of a terminal operating in an idle mode according to an exemplary embodiment of the present invention.

FIG. 5 is a flowchart illustrating the process of an IP handoff method of a terminal operating in an idle mode according to an exemplary embodiment of the present invention. Here, it is assumed that IP mobility is supported according to the proxy MIP technique. According to the proxy MIP technique, a device, e.g., a router, supporting the proxy MIP (referred to as a "proxy MIP supporting device" hereinafter) is connected with a plurality of APs. When a terminal moves between or among a plurality of APs that belong to the same subnet or are connected with the same proxy MIP supporting device, IP handoff, which occurs in an IP layer, does not occur. However, when the terminal moves between or among a plurality of APs that belong to different subnets or are connected with different proxy MIP supporting devices, IP handoff occurs.

With reference to FIG. 5, when the terminal moves to an area of the new AP, it attempts to be connected with the new AP. That is, the terminal transmits a reassociation request message to the new AP (S500). In this case, it is assumed that the new AP belongs to a different subnet from that of the old AP or is connected with a different proxy MIP supporting device.

The new AP transmits an IP handoff request message with respect to the terminal that has moved to the area of the new AP to the proxy MIP supporting device to which the new AP is connected (referred to as a "new proxy MIP supporting device" hereinafter) (S510), and transmits a reassociation response message to the terminal (S520). In this case, the IP handoff request message may include a MAP address of the old AP to which the terminal was previously connected, an IP address of the proxy MIP supporting device to which the old AP is connected (referred to as an "old proxy MIP supporting device" hereinafter), an address of a subnet to which the old AP belongs, a MAC address of the terminal, etc. Here, the new AP may know about a MAC address of the old AP and the MAC address of the terminal through the reassociation request message that has been received from the terminal. Further, the terminal may know about an IP address of the old proxy MIP supporting device from the old AP. That is, the terminal may know about the IP address of the old proxy MP supporting device by using a beacon message, an idle mode response message, a reassociation response message, a management message, and the like that the terminal has received from the old AP when it was connected with the old AP. Meanwhile, unlike the case in which the IP address of the old proxy MIP supporting device is received from the terminal, the new proxy MIP supporting device may maintain a table regarding the IP address of the proxy MIP supporting device and acquire the IP address of the old proxy MIP supporting device. There is no limitation in methods for acquiring the IP address of the old proxy MIP supporting device by the new proxy MIP supporting device.

The new proxy MIP supporting device performs the IP handoff operation together with the old proxy MIP supporting device by using the IP address of the old proxy MIP supporting device (S530).

Figure 6:
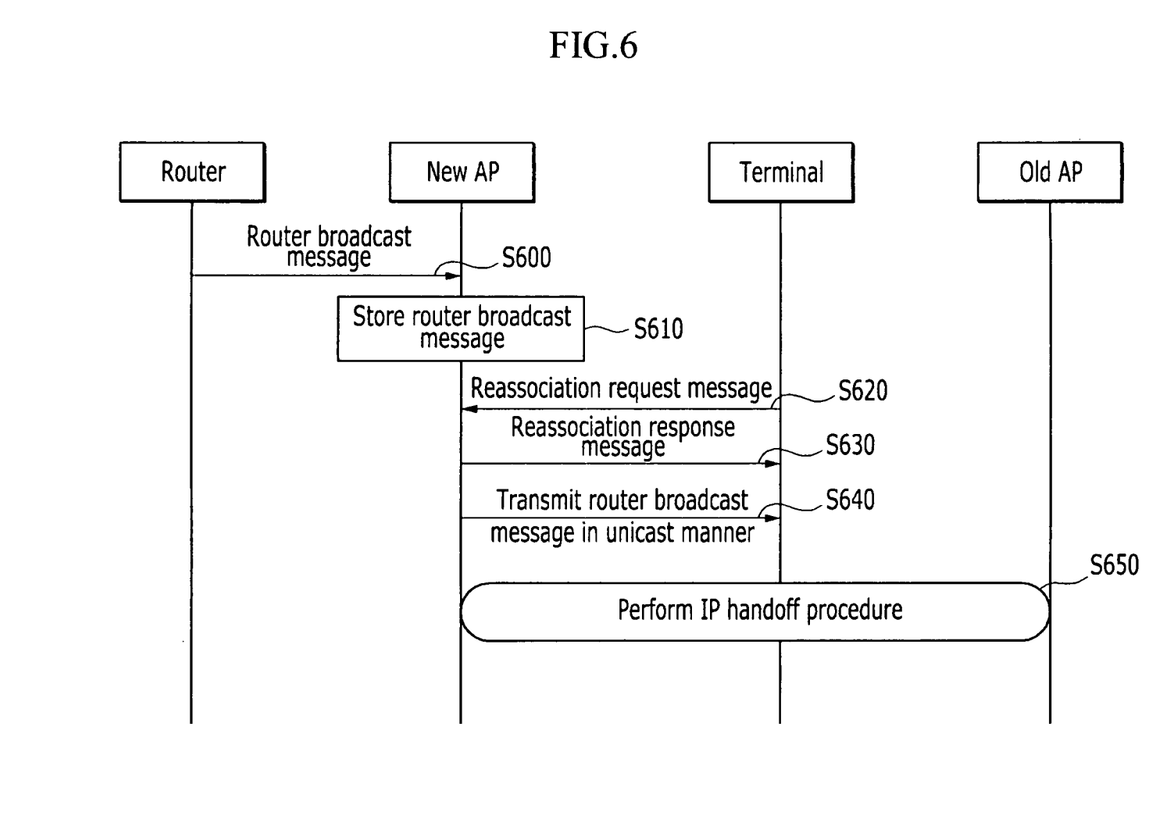
FIG. 6 is a flowchart illustrating the process of an IP handoff method of a terminal operating in an idle mode according to another exemplary embodiment of the present invention.

FIG. 6 is a flowchart illustrating the process of an IP handoff method of a terminal operating in an idle mode according to another exemplary embodiment of the present invention. Here, it is assumed that the MIP technique in which the terminal directly supports IP mobility without using a proxy MIP supporting device is employed. According to the MIP technique, the terminal starts an MIP operation upon receipt of a broadcast message, e.g., a router broadcast (or a router advertisement), from the IP layer of the terminal. When the terminal operating in the idle mode receives the broadcast message from the IP layer, power is unnecessarily consumed. A method for solving such a problem will now be described.

With reference to FIG. 6, a router periodically or aperiodically transmits a router broadcast to APs connected thereto (S600), and the APs store the received router broadcast (S610).

When the terminal moves to an area of the new AP, it attempts to be connected with the new AP. That is, the terminal transmits a reassociation request message to the new AP (S620). The reassociation request message includes a MAC address of the old AP to which the terminal was previously connected, an address of a subnet to which the old AP belonged, the MAC address of the terminal, and information for an idle mode. The reassociation request message may further include information, that is, direct multicast service (DMS), requesting conversion of a broadcast message required for the terminal to start the MIP operation into a unicast message and transmission of the same. For example, a DMS defined in IEEE 802.11 refers to a scheme of incorporating a multicast message or a broadcast message with a MAC service data unit, which is individually transmitted with respect to a terminal, and transmitting the same. Hereinafter, the DMS means every service that converts a multicast message or a broadcast message into a unicast message and transmits the same, as well as the meaning defied in IEEE 802.11. When the terminal includes the DMS request message in the reassociation request message and transmits the same, the terminal may receive a router broadcast related to IP mobility as a unicast message from the new AP.

Upon receiving the reassociation request message from the terminal, the new AP transmits a reassociation response message to the terminal (S630). When the new AP determines that IP handoff is required, it may include DMS acceptance information in the reassociation response message, and when the new AP determines that IP handoff is not required, it may include DMS rejection information in the reassociation response message.

In the above description, the new AP can transmit the DMS acceptance information to the terminal only when the DMS request information is received from the terminal, but the new AP may determine whether to transmit DMS acceptance information independently.

The new AP transmits a router broadcast regarding the IP handoff in a unicast manner to the terminal (S640). The new AP may store or cache the router broadcast received from the network, and quickly transmits it in a unicast manner to the terminal. It is illustrated that the new AP transmits the router broadcast in a unicast manner, separately from the reassociation response message, but the new AP may include the router broadcast in the reassociation response message and transmit the same.

Upon receiving the reassociation response message including the DMS acceptance information, and the router broadcast regarding the IP handoff, the terminal performs an IP handoff procedure (S650). In this case, the terminal may perform the IP handoff procedure while it is operating in the idle mode, or may terminate the idle mode and then perform the IP handoff procedure. When the terminal terminates the idle mode and then performs the IP handoff procedure, information requesting the termination of the idle mode may be included in the reassociation response message.

When the terminal terminates the idle mode and then performs the IP handoff procedure, in order to resume the idle mode, the terminal may transmit a request message for starting the idle mode to the new AP and the new AP may transmit a response message with respect to the start of the idle mode to the terminal.

The exemplary embodiments of the present invention as described so far are not implemented only through a device or a method, but may be implemented through a program that can realize a function corresponding to the configuration of the exemplary embodiments of the present invention or a recording medium storing the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for supporting an idle mode of a terminal in a wireless local area network (WLAN) system, the method comprising:

transmitting a first request message for starting an idle mode to a first access node to which the terminal is currently connected;

receiving a first response message with respect to the first request message from the first access node; and starting an idle mode when the first response message includes acceptance information accepting a start of the idle mode, and rejecting the start of the idle mode when the terminal fails to meet predetermined conditions for starting the idle mode, wherein when the terminal moves to an area of a second access node while in the idle mode, the first access node recognizes that the terminal has moved upon receiving a request message for releasing resources allocated to the terminal transmitted by the second access node, and upon receiving the request message for releasing the resources, the first access node terminates supporting of the idle mode of the terminal and releases the resources allocated to the terminal, and wherein when the terminal initially moves to the area of the second access node, the terminal transmits a reassociation request message to the second access node, and the second access node transmits the request message for releasing the resources to the first access node by using information included in the reassociation request message.

2. The method of claim 1, further comprising:
receiving a paging indication message from the first access node in the idle mode;
transmitting a second request message for terminating the idle mode to the first access node;
receiving a second response message with respect to the second request message from the first access node;
when the second response message comprises acceptance information regarding the termination of the idle mode, terminating the idle mode.

3. The method of claim 2, wherein the paging indication message is received through at least one of a beacon message, a multicast/broadcast message, and a flexible multicast service (FMS).

4. The method of claim 2, wherein the paging indication message comprises a terminal identifier identifying the terminal or a terminal group identifier identifying a group of the terminal.

5. The method of claim 1, further comprising:
when the terminal moves to an area of the second access node in the idle mode, the terminal transmits a third request message for a connection to the second access node to the second access node; and
receiving a third response message with respect to the third request message from the second access node.

6. The method of claim 5, wherein the third request message comprises a medium access control (MAC) address of the first access node.

7. The method of claim 6, wherein,
when there is traffic with respect to the terminal, the third response message further comprises paging information indicating termination of the idle mode of the terminal.

8. The method of claim 6, further comprising,
when there is traffic with respect to the terminal, receiving a paging indication message from the second access node after the third response message is received.

9. The method of claim 1, further comprising receiving a paging indication message from the first access node, the paging indication message includes traffic arrival information and is transmitted by the first access node when traffic arrives from a network for the terminal that has started the idle mode.

10. A method for supporting an idle mode of a terminal in a WLAN system by an access node, the method comprising:
receiving a request message for a connection to the access node from a terminal that has entered an area of the access node while operating in an idle mode;
when it is determined that Internet protocol (IP) handoff is required for the terminal, transmitting an IP handoff request message to an IP handoff supporting device to which the access node is connected; and
after the IP handoff supporting device performs an IP handoff procedure, establishing a connection with the terminal, based on information included in the IP handoff request message,
wherein when the terminal enters the area of the access node while operating in the idle mode, an old access node recognizes that the terminal has moved based on a request message for releasing resources from the access node, and upon receiving the request message for releasing the resources, the old access node terminates supporting of the idle mode of the terminal and releases the resources allocated to the terminal,
wherein when the terminal initially enters the area of the access node, the terminal transmits a reassociation request message to the access node, and the access node transmits the request message for releasing the resources to the old access node by using information included in the reassociation request message, and
wherein the idle mode is initially started when a response message from the old access node includes acceptance information accepting a start of the idle mode, and is initially rejected when the terminal fails to meet predetermined conditions for starting the idle mode.

11. The method of claim 10, wherein the IP handoff request message comprises at least one of a MAC address of the terminal, a MAC address of the old access node to which the terminal was previously connected, and an IP address of an old IP handoff supporting device to which the old access node was connected.

12. The method of claim 11, wherein the access node obtains the MAC address of the terminal and the MAC address of the old access node from the request message.

13. The method of claim 10, wherein the IP handoff supporting device maintains a table including IP addresses.

14. An Internet protocol (IP) handoff method of a terminal in a WLAN system, the method comprising:
transmitting a request message for connection to an access node, to the access node, when the terminal enters an area of the access node while operating in an idle mode;
receiving a response message with respect to the request message from the access node;
receiving a router broadcast message regarding IP handoff from the access node; and
performing IP handoff by using the router broadcast message,
wherein when the terminal enters the area of the access node while operating in the idle mode, an old access node recognizes that the terminal has moved based on a request message for releasing resources from the access node, and upon receiving the request message for releasing the resources, the old access node terminates supporting of the idle mode of the terminal and releases the resources allocated to the terminal,
wherein when the terminal initially enters the area of the access node, the terminal transmits a reassociation request message to the access node, and the access node transmits the request message for releasing the resources to the old access node by using information included in the reassociation request message, and
wherein the idle mode is initially started when a response message from the old access node includes acceptance information accepting a start of the idle mode, and is initially rejected when the terminal fails to meet predetermined conditions for starting the idle mode.

15. The method of claim 14, wherein the request message comprises information requesting that the access node converts a multicast message or a broadcast message into a unicast message and transmits the converted unicast message.

16. The method of claim 15, wherein the response message comprises acceptance information with respect to the information requesting the conversion into the unicast message and transmission of the converted unicast message, and when receiving the router broadcast message, the router broadcast message is received as a unicast message.

17. The method of claim 15, wherein the request message further comprises a MAC address of the terminal and a MAC address of the old access node to which the terminal was previously connected.

18. A method for supporting, by an access node, IP handoff of a terminal in a WLAN system, the method comprising:
- receiving a request message for a connection to the access node from a terminal that has entered an area of the access node while the terminal is operating in an idle mode;
- transmitting a response message with respect to the request, to the terminal;
- transmitting a router broadcast message regarding Internet protocol (IP) handoff in a unicast manner to the terminal; and
- performing IP handoff by the terminal, using the router broadcast message,
- wherein when the terminal enters the area of the access node while operating in the idle mode, an old access node recognizes that the terminal has moved based on a request message for releasing resources from the access node, and upon receiving the request message for releasing the resources, the old access node terminates supporting of the idle mode of the terminal and releases the resources allocated to the terminal,
- wherein when the terminal initially enters the area of the access node, the terminal transmits a reassociation request message to the access node, and the access node transmits the request message for releasing the resources to the old access node by using information included in the reassociation request message, and
- wherein the idle mode is initially started when a response message from the old access node includes acceptance information accepting a start of the idle mode, and is initially rejected when the terminal fails to meet predetermined conditions for starting the idle mode.

19. The method of claim 18, wherein the request message comprises information requesting that the access node converts a multicast message or a broadcast message into a unicast message and transmits the converted unicast message, and the response message comprises acceptance information with respect to the information requesting the conversion into the unicast message and transmission of the unicast message.

20. The method of claim 18, wherein the access node receives the router broadcast message from a network and previously stores the received router broadcast message.

* * * * *